United States Patent [19]
Coxon

[11] 4,235,223
[45] Nov. 25, 1980

[54] SOLAR-LIQUID HEAT SYSTEM
[75] Inventor: DeWayne A. Coxon, Cedar Springs, Mich.
[73] Assignee: Jordan College, Cedar Springs, Mich.
[21] Appl. No.: 879,382
[22] Filed: Feb. 21, 1978
[51] Int. Cl.³ .............................................. F24J 3/02
[52] U.S. Cl. ..................................... 126/437; 126/422
[58] Field of Search .............. 126/270, 271, 400, 421, 126/422, 435, 437, 452; 237/1 A; 165/18, 104 S; 137/574, 584, 571

[56] References Cited
U.S. PATENT DOCUMENTS

| | | | |
|---|---|---|---|
| 2,713,252 | 7/1955 | Jackson et al. | 165/18 |
| 3,931,806 | 1/1976 | Hayes | 126/400 |
| 4,012,920 | 3/1977 | Kirschbaum | 126/400 X |
| 4,021,895 | 5/1977 | Morse et al. | 237/1 A |
| 4,037,785 | 7/1977 | Madern | 237/1 A |
| 4,119,086 | 10/1978 | Brussels | 237/1 A X |

Primary Examiner—James C. Yeung
Assistant Examiner—Larry Jones
Attorney, Agent, or Firm—Price, Heneveld, Huizenga & Cooper

[57] ABSTRACT

A liquid medium solar heating system especially suitable to effectively capture intermittent and/or low intensity solar radiation as in cooler and/or cloudier climates. The system employs a quick response liquid storage having a capacity equal to only a small fraction of the capacity of the main storage with which it is combined. Temperature responsive flow control means causes preferential heated liquid flow from the collector to the quick response day storage, creating a usable thermal driving potential of a substantial temperature differential between heat exchange liquid in the day storage unit and the environmental space to be heated. Valved conduits between these components, and a pump cooperative therewith, achieve temperature responsive flow for optimizing heat salvage.

5 Claims, 7 Drawing Figures

SOLAR-LIQUID HEAT SYSTEM

BACKGROUND OF THE INVENTION

This invention relates to a solar heating system employing a liquid heat exchange medium such as water.

Significant technological progress has been made in solar heating systems in recent years, following the realization of limits on fossil fuels and the rapidly increasing cost thereof. Solar heating is becoming a practical reality in some geographical areas, particularly in the southern and southwestern parts of the united States, sometimes designated the sun belt. In the more nothern regions, as in the northwestern, midwestern, and northeastern parts of the United States however, where the number of sunny days is less, i.e. solar radiation is only intermittent and/or has less intensity, there is difficulty justifying the installation cost of solar equipment because of the considerably lower efficiency thereof. There are many cloudy or partly cloudy days when the collector cannot generate sufficient heat to raise the temperature in the storage system more than a few degrees above that of the space to be heated. Consequently, even though a substantial amount of total heat is theoretically available in the typical storage reservoir of several thousand gallons of liquid, there simply is not enough "driving potential" in terms of temperature differential between the heat storage liquid and the environmental space to be heated to enable effective heat transfer therebetween. The theoretical heat therefore cannot be effectively utilized. Hence, the solar system is typically deactivated at such times, with the heat required being totally generated by fossil fuel combustion. Unfortunately, the same geographic regions of cooler climate and less sunshine are more in need of whatever solar energy there is available.

SUMMARY OF THE INVENTION

This present invention provides a liquid solar heating system usable in a variety of climates but having special advantages in colder latitudes, particularly where the sun shines intermittently and/or with less intensity.

The novel system enables the solar energy that is available to be harnessed in a manner to create a significant thermal driving potential, i.e. sufficient temperature differential, between the heat exchange liquid and the environmental space to be heated. The heat can thereby be effectively transferred to supplement heat generated from fossil fuels.

The novel system employs, in combination with a large conventional storage tank and a solar collector, a significantly smaller, quickly responsive day storage tank, so coupled into the system as to supply liquid with useful thermal driving potential from intermittent or lower intensity solar radiation.

Specially arranged conduits and control valves cause heat energy from the collector to be preferentially applied to the day storage liquid which heats the environmental space to the extent able, and if there is excess energy from the collector, to supply the excess to the liquid in the main storage reservoir. During periods of no solar energy collection, heat in the main storage can be supplied through the quick response day storage to the environmental space to be heated.

The entire system can be operated with only one pump so as to be relatively inexpensive and affordable to the average householder, for supplementing fossil fuel heat or forming a complete substitute therefor, depending upon climatic conditions.

During periods of no available solar energy, the system causes automatic draining of the fluid from the collector to avoid freezing thereof.

DESCRIPTION OF THE PREFERRED EMBODIMENT

Figure 1:
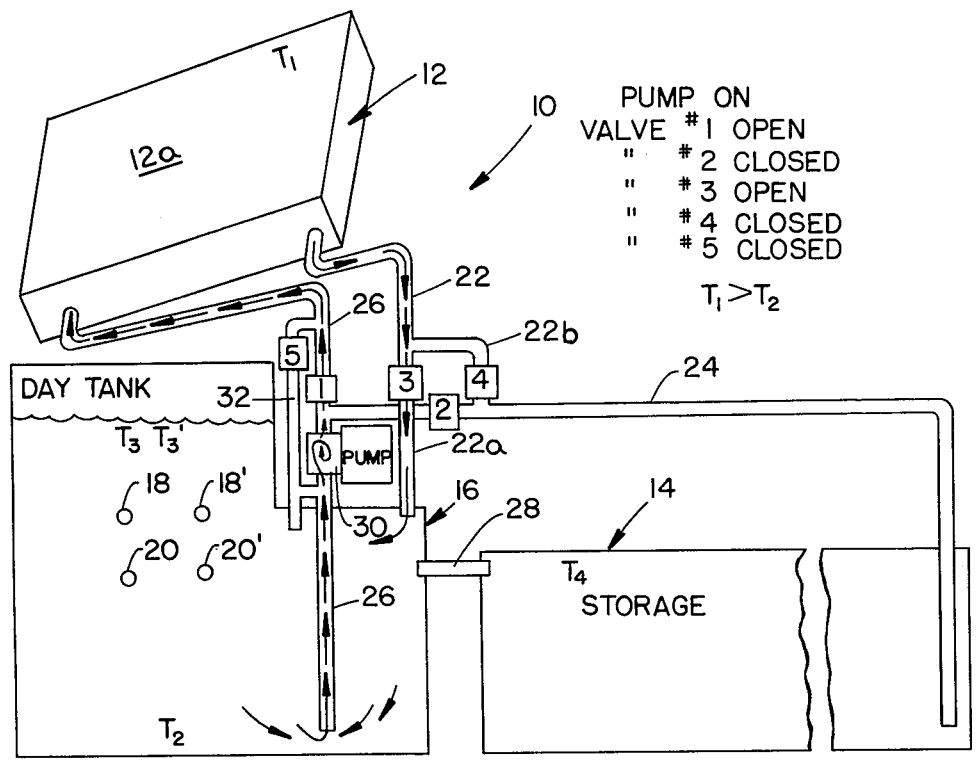
FIG. 1 is a schematic diagram of the novel system shown in the first mode of operation.

The term environmental space is used herein to broadly designate any space or volume to be heated, such usually being filled with air, e.g. a room, but also possibly containing a liquid, e.g. a pool.

Referring now specifically to the drawings, the liquid solar system 10 there depicted employs a solar collector subassembly 12 of a selected number of any of several type units available. Collector 12 is mounted for optimum exposure to solar radiation, having liquid conduit means extending therethrough for heat exchange from the solar radiation to the liquid being conducted through the conduit. Solar radiation is transmitted through the protective cover 12a on the unit. System 10 has a large conventional main liquid storage vessel or tank 14, typically located underground or in the basement of the structure, preferably well-insulated, with a capacity of thousands of gallons of the heat exchange liquid medium such as water.

Cooperative with the solar collector and main storage is a small day storage tank 16 having a volume capacity only a small fraction of that of the main storage 14, e.g. about 200–300 gallons in comparison to several thousand gallons, i.e. its capacity is only about 1/10 or so of the main storage. Extending from this small day storage is a series of connections to the environmental space or spaces to be heated. Specifically, a pair of connectors 18 and 18' provide an outlet and a return for liquid to be circulated through a water or other liquid heating system of space to be heated. Such a space could be, for example, rooms of a dwelling, an office space, industrial space or otherwise. A second pair of outlet and inlet connections 20 and 20' can be employed to conduct the liquid through a suitable heat exchanger (not shown) for heating water for bathing and the like. Optionally a third set could be employed to heat water in a pool, heat another space or otherwise as desired. Obviously, the possibilities are many and varied. Therefore, it is intended that the expressions herein referring to heating an environmental space include direct heating and indirect heating as well as various types of spaces or volumes.

The conduit in collector 12 extends from the collector as conduit 22, with one branch 22a extending to day tank 16 and another branch 22b joining a conduit 24 which extends to the main storage tank 14. Another conduit 26 extends from the lower, i.e. coolest portion of day tank 16, to the intake of solar collector 12. On conduit 26 is a motor driven pump 30. Conduit 24 communicates with conduit 26 downstream of pump 30. A conduit 28 connects the upper part of main storage unit 14 to day storage 16.

A powered control shutoff valve 1 is in conduit 26 downstream of pump 30 and downstream of the connection with conduit 24, to close off the flow between day tank 16 and collector 12 when the valve is activated. In parallel with valve 1 and pump 30 is conduit 32 communicating with conduit 26 downstream of valve 1 and pump 30, and extending back to the day tank 16 to bypass valve 1 and pump 30. Conduit 32 includes a powered valve 5.

Conduit 22a has a powered shutoff valve 3 downstream of connection to conduit 22b, between conduit 22b and day tank 16. Conduit 22b has a powered shutoff valve 4 upstream of the connection of conduit 22b with conduit 24. Conduit 24 has a powered shutoff valve 2 between the connection of conduit 24 to conduit 26 and the connection of conduit 24 to conduit 22b. These valves may be solenoid operated, preferably rotary in motion, arranged to be biased open when not power activated.

These powered flow control valves are responsive to temperature sensor controllers, to create a temperature responsive flow control means for the system. The system causes preferential flow of heated liquid from the solar collector to the day storage, all in a manner to be described hereinafter.

The temperature sensor units are as follows. Temperature sensor $T_1$, associated with the differential thermostat 40 is located in the highest energy, i.e. highest temperature portion of the solar collector 12, toward the discharge end of the conduit extending therethrough. Temperature sensor $T_2$ of the differential thermostat 40 is located at about the lowest energy portion of the day storage tank 16, e.g. near the bottom thereof. Temperature sensor $T_3$ associated with the differential thermostat 42 is located at the highest energy location of the day storage tank 16, e.g. near the top thereof. Temperature sensor $T_4$, also associated with differential thermostat 42, is located in the higher energy portion of the main storage tank 14, e.g. near the discharge conduit 28 connecting the main storage tank to the day storage tank. Temperature sensor $T_3'$ is located adjacent sensor $T_3$, and controls contacts to relay solenoids CR6A and CR6B.

The differential thermostats 40 and 42 are of conventional type, e.g. those sold under the trademarks "Honeywell" or "Rho Sigma". Differential thermostat 40 is responsive to a preset differential between the temperatures at sensors $T_1$ and $T_2$, specifically of the temperature at $T_1$ above the temperature at $T_2$. Differential thermostat 42 is responsive to a preset differential between the temperature at sensors $T_4$ and $T_3$, specifically of the temperature at $T_4$ above that at $T_3$.

Figure 2A:
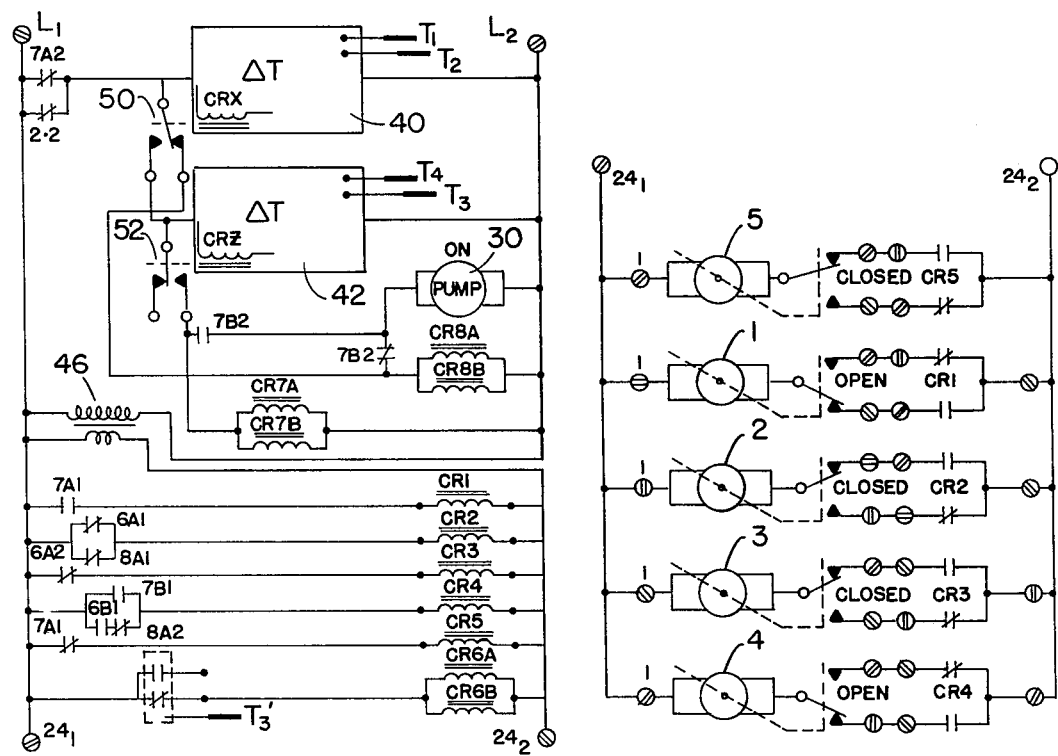
FIG. 2A is a schematic of the control system in FIG. 1a for the second mode.
Figure 3:
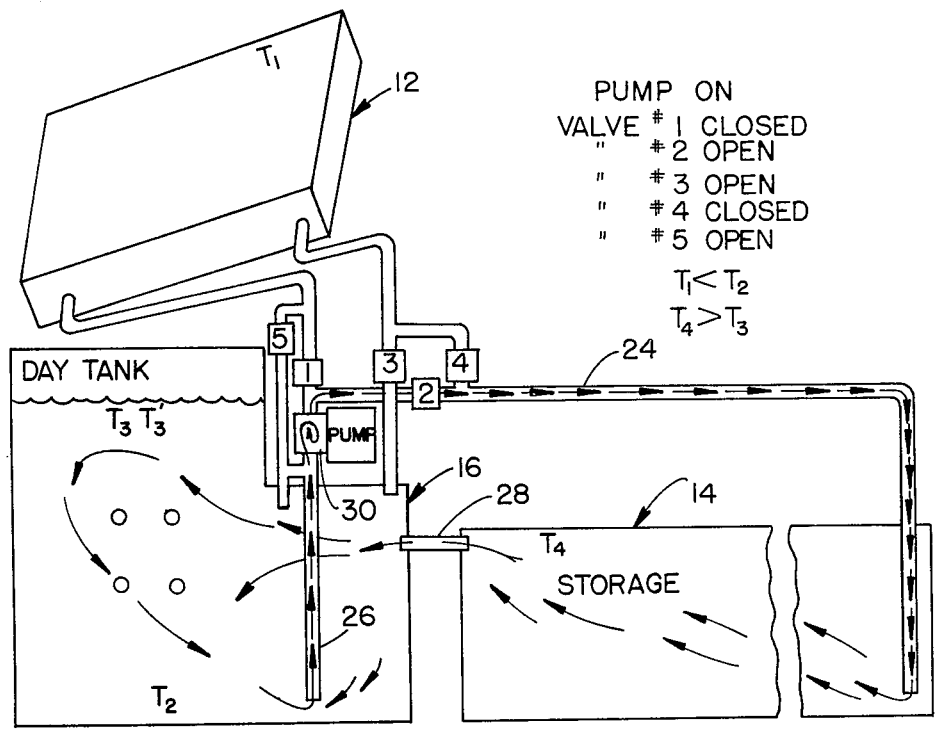
FIG. 3 is a schematic diagram of the system in FIG. 1, shown in the third mode of operation.
Figure 3A:
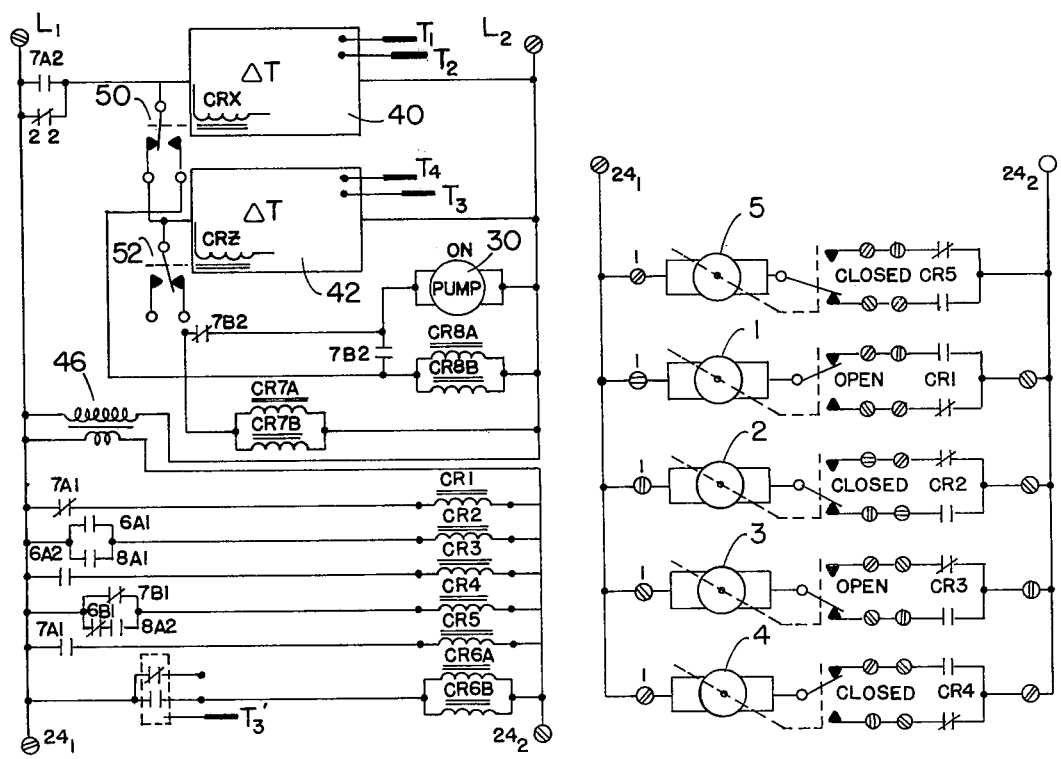
FIG. 3A is the electrical schematic of FIGS. 1a and 2a for the third mode.

The five solenoid valves 1, 2, 3, 4 and 5 are operated through relays CR1, CR2, CR3, CR4 and CR5 respectively (FIG. 1A), preferably at a lower voltage than line voltage, e.g. 24 volts, because of transformer 46. The circuit portion shown to the right in each of FIGS. 1A, 2A and 3A is connected to the portion at the left at connectors $24_1$ and $24_2$.

Figure 1A:
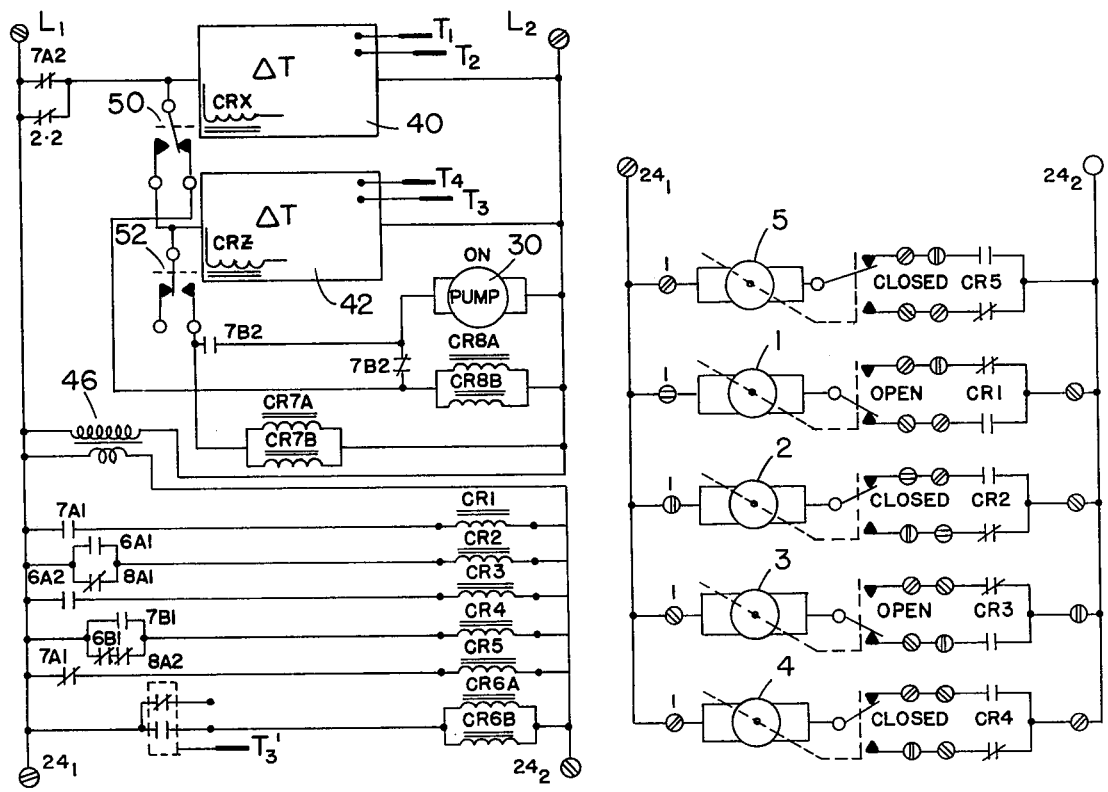
FIG. 1A is an electrical schematic diagram of the controls for the first mode in FIG. 1.

In the first mode depicted, FIGS. 1 and 1A, liquid is recirculated from solar collector 12 to the day storage tank 16 and back. In this mode, valves 1 and 3 are open while valves 2, 4 and 5 are closed. Temperature at sensor $T_1$ is greater than temperature at $T_2$ sufficient to cause the differential thermostat 40 to operate solenoid CRX to throw switch 50 to the right as depicted in FIG. 1A. Contacts 7A2 and 2.2 are normally closed. Potential is applied across solenoids CR8A and CR8B. Switch 50 in this condition also allows activating of pump 30 through closed contacts 7B2 to cause liquid to be pumped from the bottom of day storage tank 16 through conduit 26 to the inlet of solar collector 12, thence through the solar collector and conduit 22, valve 3, conduit 22a back to day storage 16 for heating the small amount of liquid in the day storage tank. If both valves 1 and 2 had been closed, the relays CR2 and CR7 for contacts 7A2 and 2.2 would be energized to open these normally closed contacts.

Figure 2:
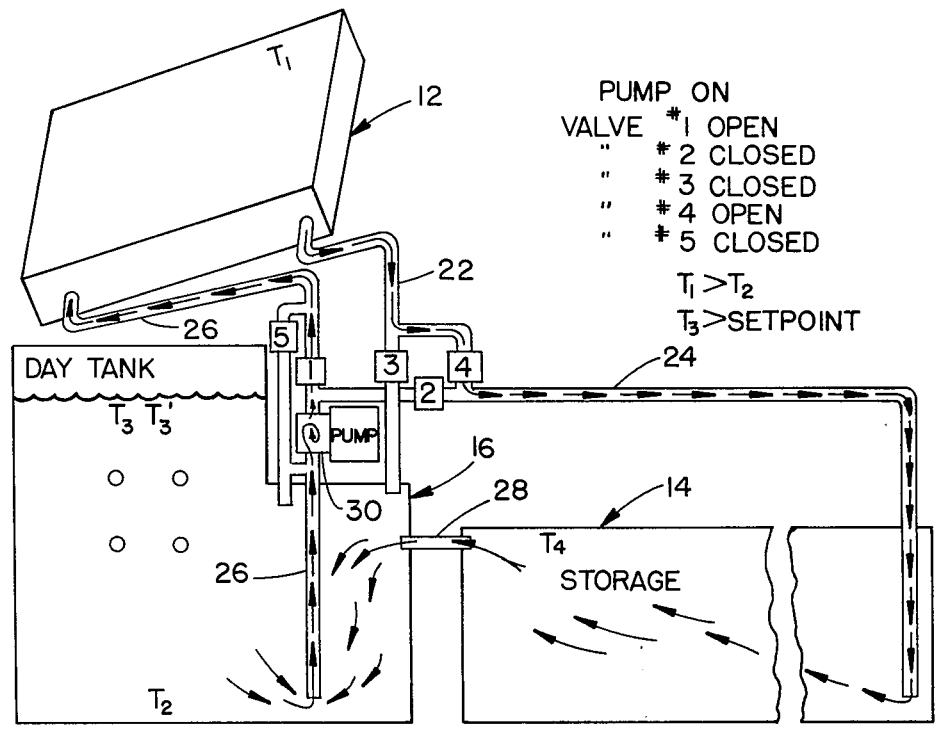
FIG. 2 is the system in FIG. 1, shown in the second mode of operation.

Sensors $T_1$ and $T_2$ are set to cause the differential thermostat 40 to activate at a temperature differential greater than about 20° F. to actuate relay CRX which thus energizes pump 30 to normally close contact 7B2 and also energizes relays CR8A and CR8B. Relay CR8 energized with the pump closes valves 2 and 4 through contacts 8A1 and 8A2. Valve 5 operates opposite to that of valve 1 through the normally closed contacts CR7A1. This type of recirculation causes whatever energy there is available at the solar collector to be effectively utilized to heat the small amount of water in the day storage tank to a significant temperature. This creates a significant thermal driving potential that can be effectively used for heat exchange purposes when water in the day tank is recirculated through ports 18, 18' and/or 20 and 20', for example, to the environmental space to be heated. If the temperature at sensor $T_3'$ rises above its predetermined set point, preferably somewhere between about 150° and 190° F., it closes the circuit to relay coils CR6A and CR6B, so that the system is shifted into the second mode shown in FIGS. 2 and 2A.

More specifically, the temperature at sensor $T_1$ will still be greater than the temperature at sensor $T_2$ and the temperature at sensor $T_3'$ has reached the predetermined set point. In this condition, valves 1 and 4 will be open and valves 2, 3 and 5 will be closed. When the temperature at sensor $T_3$ reaches the set point by constantly recirculating heated water from the collector, relays CR6A and CR6B will energize contacts 6A1 and 6A2, closing valves 2 and 3, and opening contacts 6B1, valves 1 and 4. Valve 5 will be closed with opening of valve 1. In this condition water or other heat exchange liquid will circulate from the day tank to the collector to the main storage and back to the day tank, transferring excess energy from the day tank to the main storage. If the environmental space calls for heat and removes energy from the day tank, this same circulation in the second mode will continue until sufficient energy is removed from the day tank to lower the temperature at sensor $T_3'$ below the set point, whereupon the system resumes the first mode in FIGS. 1 and 1A.

In the event that the temperature at sensor $T_1$ drops below that at sensor $T_2$, i.e. during periods of inadequate solar radiation to accomplish any significant heating in the collector, the system reverts to the third mode depicted in FIGS. 3 and 3A. In this mode the temperature at sensor $T_4$ in the main storage tank is higher than the temperature at sensor $T_3$ in the day storage tank. Under these conditions, valves 1 and 4 will be closed and 2, 3 and 5 will be open. The opening of valves 3 and 5 allows the coolent to drain down out of the solar collector. Hence, if water is used, it will not freeze. Since valves 1 and 4 are closed and valve 2 is open, the output from pump 30 causes the flow to move from the day storage tank to the main storage tank and return back to the day storage tank so that heat in the main storage can be effectively utilized to be available at the day storage tank for heating the environmental space if such is called for. The fact that the temperature at $T_4$ is greater than at $T_3$ will actuate the differential thermostat 42, i.e. activating solenoid CRZ which will shift switch 52 to energize relays CR7A and CR7B which close valve 1 and allow valves 2, 3 and 5 to remain open.

Figure 4:
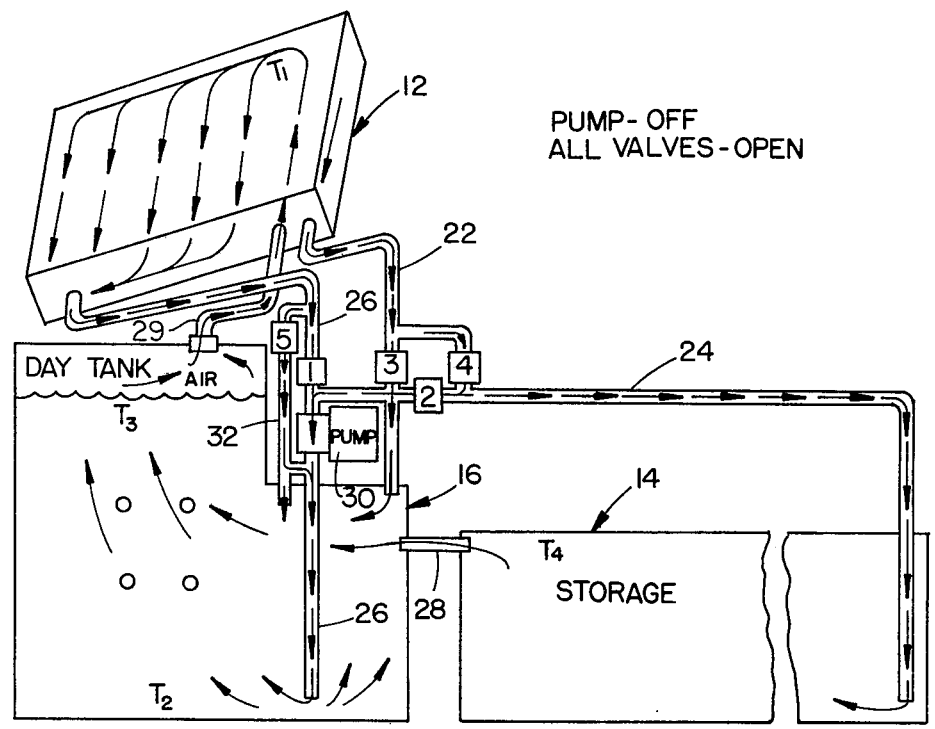
FIG. 4 is the system in FIGS. 1, 2 and 3, shown in drain down condition.

In the event that the system is totally inactivated, all of valves 1, 2, 3, 4, and 5 will be biased open to allow the liquid to drain down out of the collector and conduits to the day storage tank and the main storage tank. A suitable air return conduit 29 (FIG. 4) from the top of the day storage tank for example to the heat exchange conduit in collector 12, containing a one-way flow valve (not shown) allows air to rise and replace the liquid drained out of the collector.

The entire system can be relatively simple, needing only one pump to operate all of the various modes. The contols are also relatively simple, being capable of being packaged to be installed directly with the double tank arrangement on homes, offices, or otherwise.

The embodiments of the invention in which an exclusive property or privilege is claimed are defined as follows:

1. A solar heating system employing a liquid heat exchange medium and capable of salvaging the heat from intermittent and/or low intensity solar radiation, having, in combination with a solar collector and a main liquid storage, an added rapid-response day storage with a liquid volume only a small fraction of that of said main storage; conduit and valving means for selectively interconnecting said solar collector with said day storage and with said main storage for recirculation of liquid; and temperature responsive flow control means operatively connected to said conduit and valving means for causing preferential flow of heated liquid from said solar collector to said day storage; said temperature responsive flow control means being responsive to a predetermined elevated temperature in said day storage to cause liquid flow from said collector to said main storage; and being responsive to a predetermined low temperature in said collector and a predetermined temperature differential of said main storage over said day storage to cause flow from said main storage to said day storage.

2. The solar heating system in claim 1 wherein said flow control means includes valved conduits and pumping means; said pumping means comprises a pump arranged to selectively pump liquid from said day storage (a) to said collector and then return to said day storage, or (b) to said collector, thence to said main storage, and then back to said day storage, or (c) to said main storage and then return to said day storage.

3. The solar heating system in claim 2 wherein said valved conduits are open when said system is inactive to cause liquid drain-down from said collector to said day storage and said main storage.

4. In a liquid medium solar heating system employing a solar collector and a main liquid storage, apparatus to enable usage of intermittent and/or low intensity solar radiation comprising: a day storage unit having a volume capacity only a small fraction of the capacity of said main liquid storage; said day storage unit having flow outlet and return means for recirculating flow to an environmental space to be heated;

a first valved conduit from said solar collector to said day storage unit and including a first powered valve;

a second valved conduit from said day storage unit to said solar collector and including a second powered valve; a pump on said second valved conduit; a third valved conduit from said solar collector to said main liquid storage and including a third powered valve; a fourth valved conduit from said day storage unit to said main liquid storage, operably associated with said pump and including a forth powered valve; and a conduit from said main liquid storage to said day storage unit;

temperature sensor means in said solar collector, said main storage, and said day storage; and said pump and powered valves being responsive to said temperature sensor means to selectively pump liquid from said day storage (a) to said collector and then return to said day storage, or (b) to said collector, thence to said main storage, and then back to said day storage, or (c) to said main storage and then return to said day storage.

5. A solar heating system employing a liquid heat exchange medium and capable of salvaging the heat from intermittent and/or low intensity solar radiation, to heat an environmental space, having, in combination with a solar collector and a main liquid storage, an added rapid-response day storage with a liquid volume only a small fraction of that of said main storage and including connections for liquid circulation to an environmental space to be heated; conduit and valving means for selectively interconnecting said solar collector with said day storage and with said main storage for selective recirculation of liquid; temperature sensing means for measuring temperatures in said main storage, said day storage, and said collector, and temperature responsive flow control means associated with said temperature sensing means and operatively connected to said conduit and valving means, for causing preferential flow of heated liquid from said solar collector to said day storage to heat the liquid in said day storage to a temperature creating a significant thermal driving potential for heat exchange; said temperature responsive flow control means being responsive to a predetermined difference in a temperature between said collector and said day storage to activate flow of heated liquid from said collector to said day storage; and said temperature responsive flow control means being responsive to a predetermined elevated temperature in said day storage to cause subsequent liquid flow from said collector to said main storage.

* * * * *